United States Patent [19]

Egawa

[11] Patent Number: 4,964,136
[45] Date of Patent: Oct. 16, 1990

[54] HIGH-FREQUENCY DISCHARGE PUMPED LASER DEVICE

[75] Inventor: Akira Egawa, Minamitsuru, Japan

[73] Assignee: Fanuc Ltd, Minamitsuru, Japan

[21] Appl. No.: 363,516

[22] PCT Filed: Oct. 18, 1988

[86] PCT No.: PCT/JP88/01060
§ 371 Date: May 30, 1989
§ 102(e) Date: May 30, 1989

[87] PCT Pub. No.: WO89/04074
PCT Pub. Date: May 5, 1989

[30] Foreign Application Priority Data

Oct. 29, 1987 [JP] Japan ................ 62-274405

[51] Int. Cl.⁵ .............................. H01S 3/03
[52] U.S. Cl. ....................... 372/61; 372/38; 372/33
[58] Field of Search ............. 372/61, 87, 38, 92, 372/97, 93, 33

[56] References Cited

U.S. PATENT DOCUMENTS 4,800,567 1/1989 Karube .................. 372/87

FOREIGN PATENT DOCUMENTS 0313664 5/1989 European Pat. Off.
0158886 7/1988 Japan .................. 372/61

Primary Examiner—Leon Scott, Jr.
Attorney, Agent, or Firm—Staas & Halsey

[57] ABSTRACT

A high-frequency discharge pumped laser device for producing a laser oscillation through application of a high-frequency voltage to a discharge tube, which includes a plurality of tube segments constituting the discharge tube, means for passing a laser gas axially through each of the tube segments, high-frequency power supplies for supplying a high-frequency voltage to the tube segments to generate a laser beam output, and a partition wall made of an electroconductive material and arranged between adjacent tube segments, the potential of the partition wall being maintained at a constant level. As the potential of the partition wall is maintained at a constant level, a mutual current caused by a stray capacity between the tube segments is eliminated, and thus fluctuation of the laser beam output is reduced.

3 Claims, 9 Drawing Sheets

HIGH-FREQUENCY DISCHARGE PUMPED LASER DEVICE

TECHNICAL FIELD

The present invention relates to a high-frequency discharge pumped laser device with a high-power output for use in cutting workpieces of metal or the like, and more particularly, to a high-frequency discharge pumped laser device capable of stable high-frequency discharge pumping.

BACKGROUND ART

High-frequency discharge pumped axial-flow lasers are now used for a variety of applications, due to advantages such as a high-power output, high-quality beam, stable oscillation, high-speed control capability and the like.

A conventional axial-flow type high-frequency discharge pumped laser device is illustrated in FIG. 6. In FIG. 6, numeral 1 denotes a discharge tube, which comprises four tube segments in the illustration but may have any desired number of tube segments depending on the output to be produced, and these tube segments may be arranged in parallel or in series with each other; 2 and 3 denote a total reflection mirror and an output mirror, respectively, which are accurately positioned; and 4 denotes an outgoing laser beam. The segments of the discharge tube are provided with inlet and outlet ports connected to a single Roots blower 7, and heat exchangers 5 and 6 are used to cool a laser gas heated by the electric discharge and the compressing action of the Roots blower 7. The laser gas flows in the discharge tube 1 and gas delivery tubes in the directions indicated by the arrows. The gas flows in the discharge tube 1 at the speed of about 100 m/second. Electrodes 8a, 8b to 11a, 11b are connected to respective high-frequency power supplies 12, 13, 14, and 15, and an electric discharge is produced by a high-frequency voltage from the high-frequency power supplies 12 to 15, to generate laser oscillation.

In this type of high-frequency discharge pumped laser device having plural discharge tube segments driven by respective independent high-frequency power supplies, the laser output fluctuates in the cycle of several hertz. This laser output fluctuation is illustrated in FIG. 7, wherein time is indicated along the horizontal axis and the laser output is indicated along the vertical axis. As seen from FIG. 7, a laser output of about 1,000W is subject to an approximately 30W fluctuation.

DISCLOSURE OF THE INVENTION

The object of the present invention is to solve the above-mentioned problems and provide a high-frequency discharge pumped laser device having a reduced output fluctuation and thus capable of stable high-frequency discharge pumping.

To solve the aforementioned problems, the present invention provides a high-frequency discharge pumped laser device for producing a laser oscillation through application of a high-frequency voltage to a discharge tube, comprising
a plurality of tube segments constituting the discharge tube,
high-frequency power supplies for supplying a high frequency voltage to respective tube segments, and
a partition wall made of an electroconductive material and arranged between adjacent tube segments, a potential of the partition wall being maintained at a constant level.

The aforementioned problems are caused by a mutual current produced by a stray capacity between the discharge tube segments, and the influence of the current is eliminated by arranging the partition wall between the tube segments and maintaining the potential of the wall at a constant level.

BEST MODE OF CARRYING OUT THE INVENTION

Embodiments of the present invention will be described with reference to the drawings.

Figure 8:
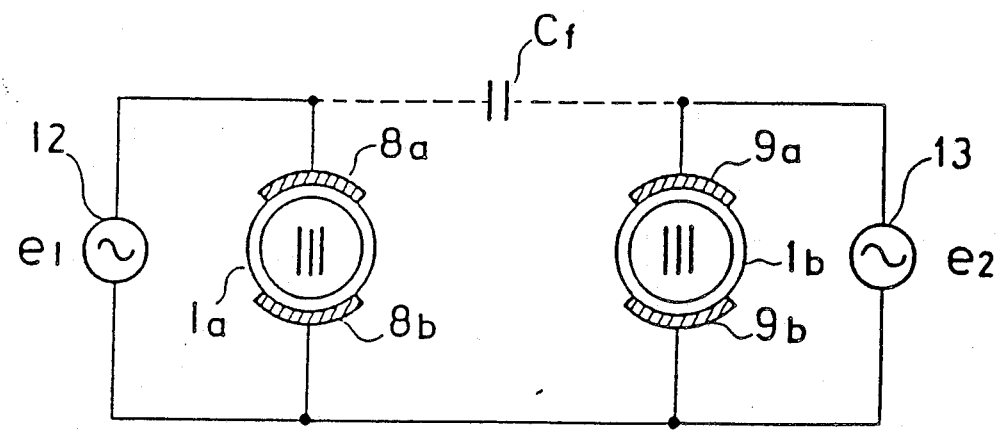
FIG. 8 is a diagram for explaining the current flow between discharge tube segment of the prior art device shown in FIG. 6.

First, an interference between the discharge tube segments will be explained, with reference to FIG. 8, which is a diagram for explaining a current flow between tube segments arranged in parallel with each other. As shown in FIG. 8, discharge tube segments 1a and 1b are provided with electrodes 8a, 8b and 9a, 9b, respectively, supplied with a high-frequency voltage from high-frequency power supplies 12 and 13. Of denotes a stray capacity between the tube segments 1a and 1b.

Figure 9:
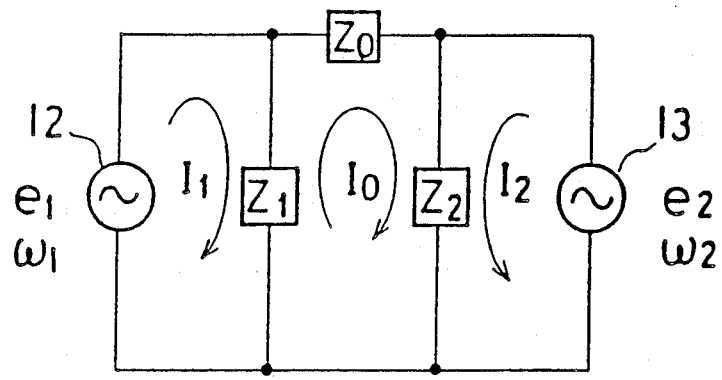
FIG. 9 is an equivalent circuit diagram of FIG. 8.

An equivalent circuit of FIG. 8 is illustrated in FIG. 9, wherein $I_1$ represents the current flowing through the circuit of the high-frequency power supply 12 in FIG. 8, $I_2$ represents the current flowing through the circuit of the high-frequency power supply 13, $I_0$ represents the interference current of these two circuits, $Z_0$ represents the impedance of the stray capacity, and $Z_1$ and $Z_2$ represent the impedances of the discharge tube segments 1a and 1b, respectively.

Voltages e1 and e2 of the high-frequency power supplies 12 and 13 are given by:

$$e1 = E_1 \sin\omega_1 t$$

$$e2 = E_2 \sin(\omega_2 t + \theta_0)$$

where $\omega_1$ represents the angular frequency of the high-frequency power supply 12, $\omega_2$ represents the angular frequency of the high-frequency power supply 13, and $\theta_0$ represents the phase difference between these two power supplies.

Accordingly, the equation $$I_1 = (Ia)^2 + (Ib)^2 + 2IaIb\cos\theta_1 \times \sin\{\theta_2 + \tan^{-1}k\}$$

stands, wherein $$\theta_1 = \omega_1 t - \omega_2 t - \theta_0 + \theta_a - \theta_b$$

$$\theta_a = \text{Arg}\{(Z_0 + Z_1)/Z_0 Z_1\}$$

$$\theta_b = \text{Arg}(1/Z_0)$$

$$\theta_2 = (\tfrac{1}{2})(\omega_1 t + \omega_2 t + \theta_0 + \theta_a + \theta_b)$$

$$k = \{(Ia - Ib)/(Ia + Ib)\} \cdot \tan(\theta_1/2)$$

$$Ia = |(Z_0 + Z_1)/Z_0 Z_1| \cdot E_1$$

$$Ib = |1/Z_0| \cdot E_2$$

Therefore, the influence of the voltage e2 is apparent. Here, assuming that the connection by the stray capacity $Z_0$ is to be eliminated, i.e., $Z_0 \to \infty$, then $$Ib \to 0$$

$$Ia \to E_1/|Z_1|$$

and accordingly, $$I_1 = E_1/|Z_1|\sin(\omega_1 t + \theta_{a1})$$

$$\theta_{a1} = \text{Arg}(1/Z_1)$$

Therefore, the influence of the voltage e2 is eliminated.

From the above it will be noted that, by eliminating the stray capacity directly connecting the discharge tube segments 1a and 1b, the interference between these tube segments 1a and 1b can be avoided.

Figure 3:
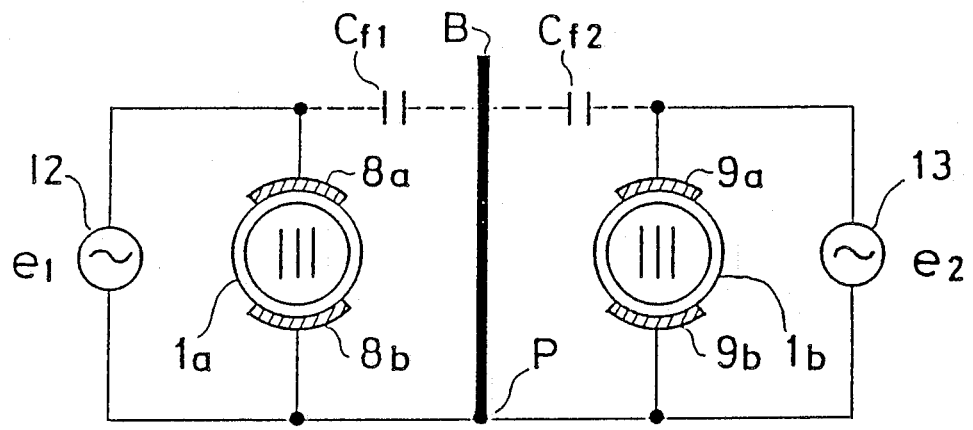
FIG. 3 is a conceptual diagram of the first embodiment.
Figure 4:
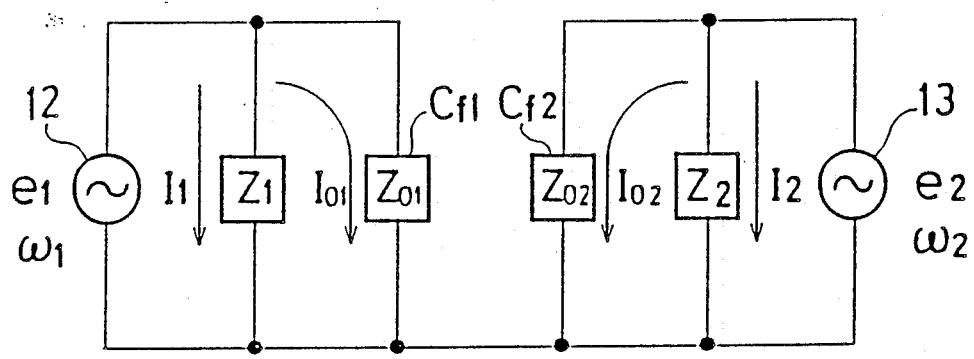
FIG. 4 is an equivalent circuit diagram of FIG. 3.

FIG. 3 is a conceptual diagram of one embodiment of the present invention, and FIG. 4 is an equivalent circuit diagram thereof. In these figures, like reference symbols are used to denote like elements or parts shown in FIGS. 8 and 9. In FIG. 3, a partition wall B is arranged between the discharge tube segments 1a and 1b and is connected at a point P to a ground potential line of the high-frequency circuits. The partition wall B divides the stray capacity between the discharge tube segments 1a and 1b into Cf1 and Cf2, as seen from the equivalent circuit diagram of FIG. 4, and since the partition wall B is grounded, a path for passing the mutual current does not exist. $Z_{01}$ and $Z_{02}$ represent the impedances of the stray capacities Cf1 and Cf2, respectively. As will be clear from the figures, $$I_1 = e_1/Z_1$$
$$= \{E_1/|Z_1|\}\sin(\omega_1 t + \theta_{a1})$$

$$\theta_{a1} = \text{Arg}(1/Z_1)$$

stand, and thus there is no influence of the other voltage e2.

Figure 1:
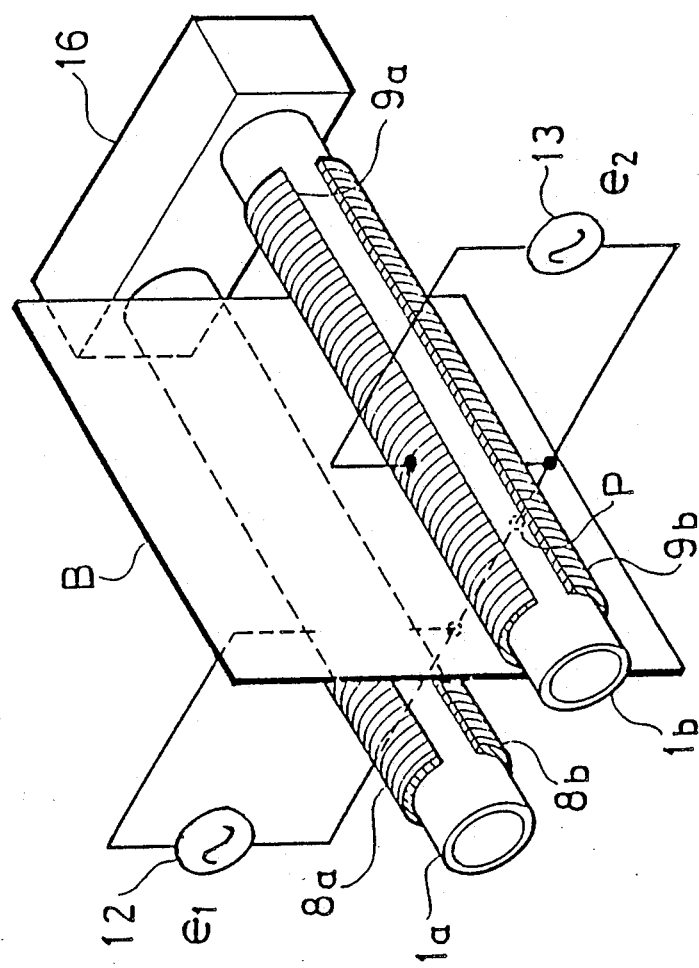
FIG. 1 is a diagram of an arrangement according to one embodiment of the present invention.
Figure 6:
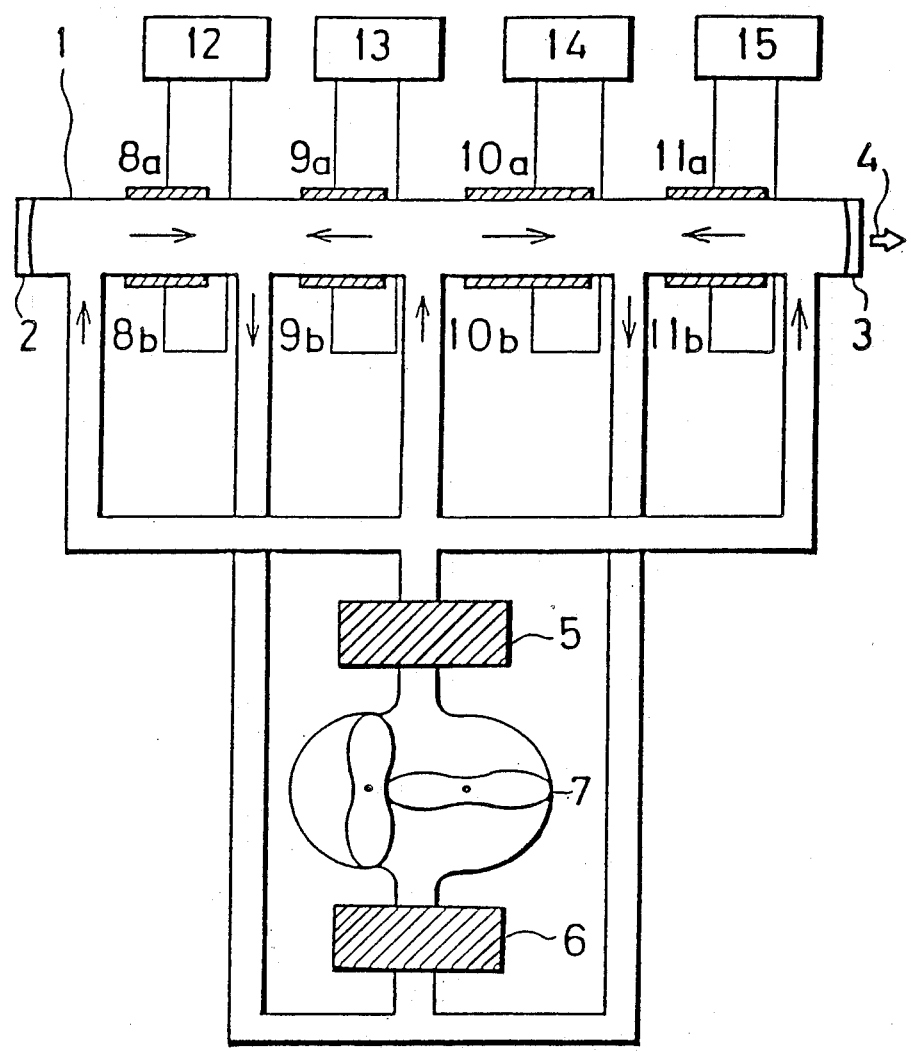
FIG. 6 is a diagram of a prior art axial-flow type high-frequency discharge pumped laser device.

FIG. 1 shows an arrangement of the discharge tube according to one embodiment of the present invention which is designed to be used in a high-frequency discharge pumped laser device such as that shown in FIG. 8. In FIG. 1, the discharge tube segments 1a and 1b arranged in parallel to each other constitute a discharge tube, and these tube segments are positioned in such a way that the axis of a laser beam can be passed continuously through these tube segments with the aid of a turning mirror or the like. Symbol B denotes the partition wall made of an electroconductive material such as copper or aluminum and arranged in parallel to the tube segments 1a and 1b, and connected at a point P to the ground potential line of the high-frequency power supplies 12 and 13, and 16 denotes a support for supporting the tube segments 1a and 1b. The other necessary elements of a high-frequency discharge pumped laser device such as a total reflection mirror, output mirror, etc. are similar to those illustrated in FIG. 6.

Accordingly, as shown in FIG. 1, the partition wall B is arranged between the parallel discharge tube segments 1a and 1b, and thus interference between the segments 1a and 1b is prevented.

Figure 2:
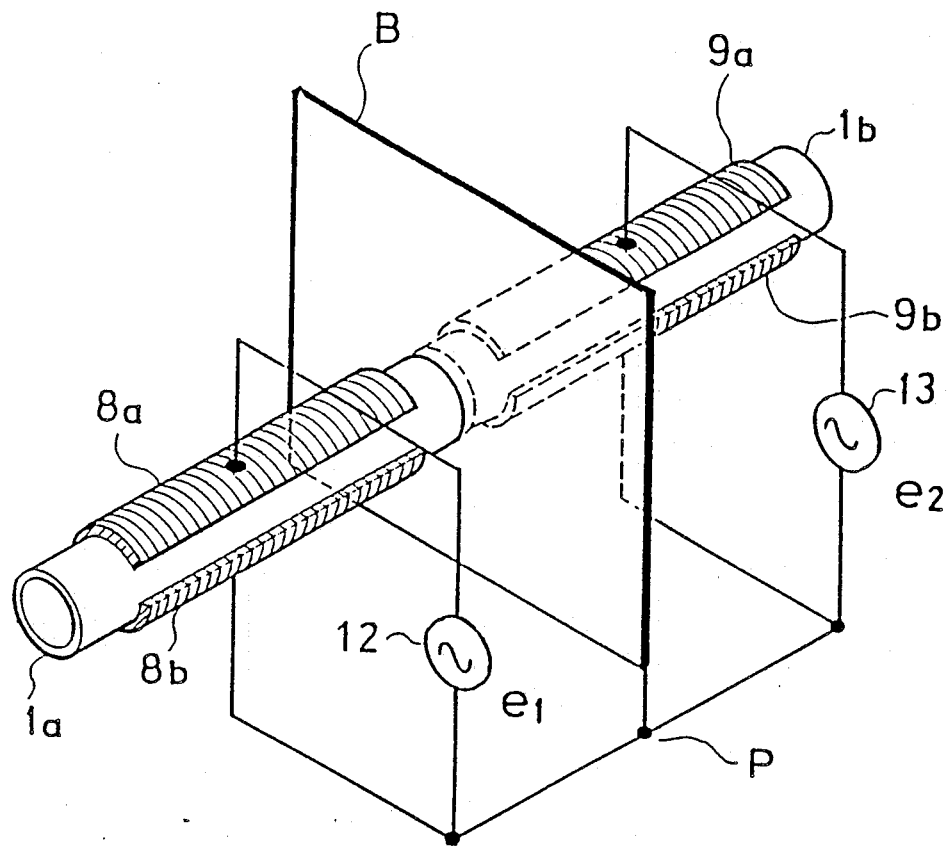
FIG. 2 is a diagram of an arrangement according to another embodiment of the present invention.

FIG. 2 shows a discharge tube arrangement according to another embodiment of the present invention also intended for use in a laser device such as that shown in FIG. 8. In the figure, the discharge tube is constituted by segments 1a and 1b arranged in series, and a laser beam is passed directly through the tube segments 1a and 1b. The partition wall B, made of an electroconductive material such as copper or aluminum, is arranged at right angles to the axis of the discharge tube segments 1a and 1b, and connected at a point P to the ground potential line of the high-frequency power supplies 12 and 13. The other elements are similar to those appearing in FIG. 6.

As shown in FIG. 2, the partition wall B is arranged between the discharge tube segments 1a and 1b, which are positioned in series, and since the partition wall B is grounded, interference between the tube segments 1a and 1b is prevented.

Figure 5:
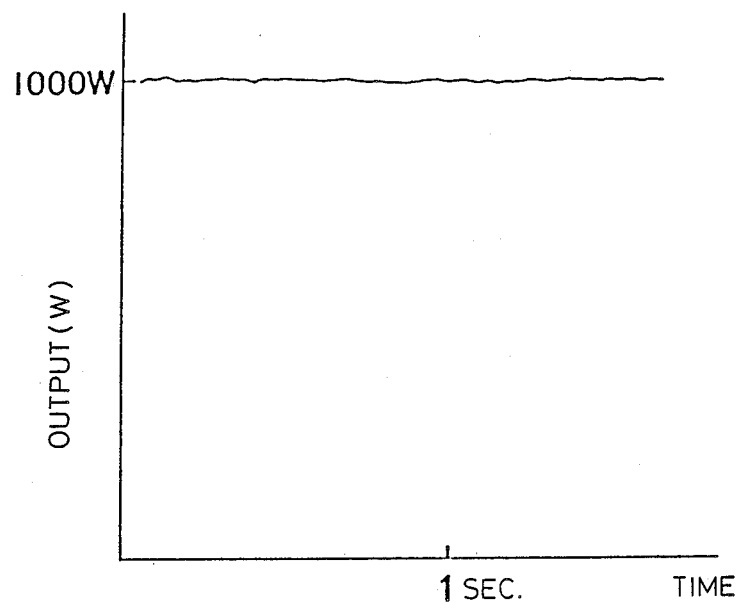
FIG. 5 is a chart showing a laser output fluctuation according to the present invention.
Figure 7:
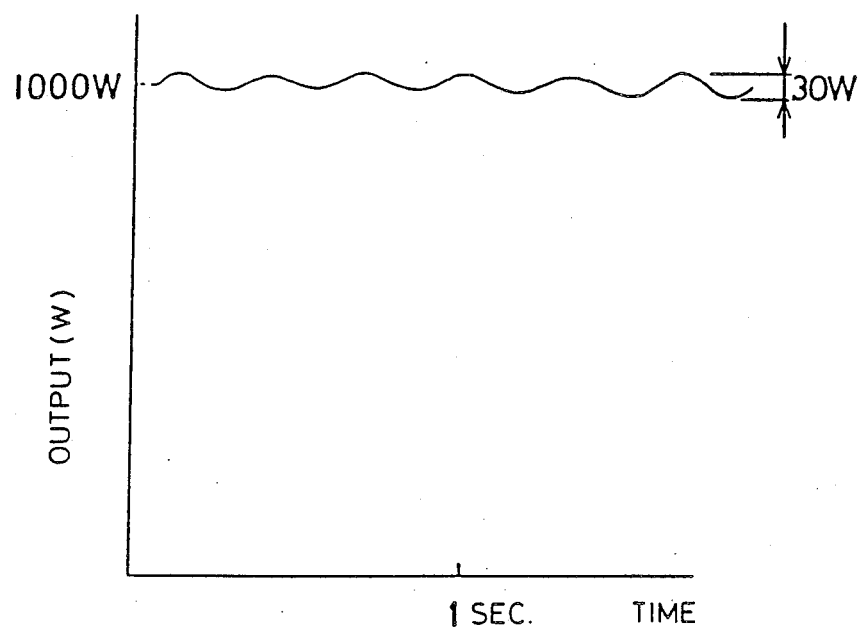
FIG. 7 is a chart showing a laser output fluctuation according to the prior art high-frequency discharge pumped laser shown in FIG. 6.

FIG. 5 is a graph showing the laser output obtained with the arrangements of FIGS. 1 and 2. In the graph, time is indicated along the horizontal axis, and the laser output is indicated along the vertical axis. As illustrated, a laser output of about 1,000W fluctuates in the range of 3W or less, which is less than one-tenth of the range of laser output fluctuation illustrated in FIG. 7.

The foregoing description is based on the use of discharge tube segments which are arranged in parallel or in series with each other, but similar advantageous effects can be obtained with an arrangement wherein a set of series-connected discharge tube segments is located in parallel to another set of similarly connected tube segments, by using the partition walls shown in FIGS. 1 and 2.

The aforementioned phenomena and effects were discovered for the first time by the inventor of the present application, and this invention was created to solve the problems peculiar to high-frequency discharge pumped laser devices of the type developed by the inventor, which include individually driven discharge tube segments.

According to the present invention, as described above, a partition wall made of an electroconductive material is provided between adjacent discharge tube segments, and the potential thereof is maintained at a constant level, whereby the interference between the discharge tube segments is eliminated and thus fluctuation of the laser output is greatly reduced.

I claim:

1. A high-frequency discharge pumped laser device for producing a laser oscillation through application of a high-frequency voltage to a discharge tube, comprising:

a plurality of adjacent tube segments constituting the discharge tube;

means for passing a laser gas axially through each of said tube segments;

a plurality of high-frequency power supplies for supplying a high-frequency voltage to each one of said tube segments to generate a laser beam output;

a partition wall made of an electroconductive material which is positioned between each of said adjacent tube segments; and means connecting said partition wall to a ground potential line of a high-frequency circuit to maintain the potential of said partition wall at a constant level.

2. A high-frequency discharge pumped laser device according to claim 1, wherein said tube segments are arranged parallel to each other.

3. A high-frequency discharge pumped laser device according to claim 1, wherein said tube segments are arranged in series.

* * * * *

UNITED STATES PATENT AND TRADEMARK OFFICE
CERTIFICATE OF CORRECTION

PATENT NO. : 4,964,136
DATED : October 16, 1990
INVENTOR(S) : AKIRA EGAWA

It is certified that error appears in the above-identified patent and that said Letters Patent is hereby corrected as shown below:

Column 2, line 28, "segment" should be --segments--;

line 43, "Of" should be --Cf--.

Column 3, line 62, "8" should be --6--.

Column 4, line 16, "8" should be --6--.

Signed and Sealed this

Third Day of March, 1992

Attest:

HARRY F. MANBECK, JR.

Attesting Officer    Commissioner of Patents and Trademarks